United States Patent
Murray et al.

(10) Patent No.: US 6,248,374 B1
(45) Date of Patent: Jun. 19, 2001

(54) STABILIZED FOOD ADDITIVE

(75) Inventors: Ralph I. Murray, St. Charles; Leonard E. Stark, Naperville, both of IL (US)

(73) Assignee: The Monsanto Company, St. Louis, MI (US)

( * ) Notice: Subject to any disclaimer, the term of this patent is extended or adjusted under 35 U.S.C. 154(b) by 0 days.

(21) Appl. No.: 09/417,639

(22) Filed: Oct. 14, 1999

(51) Int. Cl.$^7$ ........................................................ A23L 1/30
(52) U.S. Cl. ........................ 426/72; 426/73; 426/623; 426/630; 426/805; 426/807
(58) Field of Search .................... 426/72, 73, 623, 426/807, 630, 805

(56) References Cited

U.S. PATENT DOCUMENTS

| | | | |
|---|---|---|---|
| 2,918,370 | * 12/1959 | Helgren | 99/2 |
| 4,310,522 | 1/1982 | Frank | 424/236 |
| 5,043,170 | * 8/1991 | Borenstein et al. | 426/73 |
| 5,154,925 | 10/1992 | Edwards, Jr. | 424/422 |
| 5,258,189 | * 11/1993 | Efstathiou | 426/73 |
| 5,270,063 | * 12/1993 | Wullschleger et al. | 426/73 |
| 5,316,770 | 5/1994 | Edwards, Jr. | 424/442 |
| 5,366,736 | 11/1994 | Edwards, Jr. | 424/442 |
| 5,605,699 | * 2/1997 | Bernhard et al. | 424/442 |
| 5,695,794 | * 12/1997 | Stark et al. | 426/2 |
| 5,849,345 | * 12/1998 | Giger et al. | 426/2 |
| 5,935,624 | * 8/1999 | DeLuca et al. | 426/73 |

FOREIGN PATENT DOCUMENTS

| | | |
|---|---|---|
| 4337546 | * 10/1993 | (JP) . |
| 1181612 | * 9/1985 | (SU) . |
| 1391570 | * 4/1988 | (SU) . |
| 1655445 | * 6/1991 | (SU) . |
| 1658972 | * 6/1991 | (SU) . |

OTHER PUBLICATIONS

Marcus, et al, in Goodman, et al., Fat–Soluble Vitamins, "The Pharmacological Basis of Therapeutics", 8th ed., p. 1553 (1993).

Zhuge, et al., "Factors Affecting Storage Stability of Vitamin A, Riboflavin, and Niacin in Broiler Diet Premix", Poultry Science, 65:987 (1986).

Coehlo, Foodstuffs, 68(9):20 (Mar. 3, 1997).

J.S. Rennie, et al., "The Effect of Dietary 1,24–Dihydroxycholecalciferol in Preventing Tibial Dyschondroplasia in Broilers Fed on Diets Imbalanced in Calcium and Phosphorus", British J. Nutr., 69:809–816 (1993).

Ward, N.E., et al., "Research Examines Use of 25–OH Vitamin $D_3$ in Broiler Diets", Feedstuffs, 67:13–15 (1995).

McNaughton, J.L., "Vitamin Fortification Essential to Poultry Rations", Feedstuffs, 13–15 (1990).

Edwards, Jr., H.M., et al., "Quantitative Requirement for Cholecalciferol in the Absence of Ultraviolet Light", Poultry Sci., 73:288–294 (1993).

Edwards, Jr., H.M., "Efficacy of Several Vitamin D Compounds in the Prevention of Tibial Dyschondroplasia in Broiler Chickens", American Institute of Nutrition, 1054–1061 (1990).

Edwards, Jr., H.M., "The Effect of Dietary Cholecalciferol 25–Hydroxycholecalciferol and 1,25–Dihydroxycholecalciferol on the Development of Tibial Dyschondroplasia in Broiler Chickens in the Absence and Presence of Disulfiram", American Institute of Nutrition, 647–652 (1988).

Cantor, A.H., and Bacon, W.L., "Performance of Caged Broilers Fed Vitamin $D_3$ and 25–OH–Vitamin $D_3$", Poultry Sci., 57:1123–1124 (1978).

McNutt, K.W., et al., "Nutritional Effectiveness of 1,25–Dihydroxycholecalciferol in Preventing Rickets in Chicks", J. Nutr., 103:681–689 (1973).

Yarger, J. G., et al., "Comparison of Dietary 25–Hydroxycholecalciferol and Cholecalciferol in Broiler Chickens", Poultry Sci., 74:1159–67 (1994).

Farquharson, C., et al., "In Vivo Effect of 1,25–Dihydorxycholecalciferol on the Proliferation and Differentiation of Avian Chondrocytes", J. of Bone and Mineral Research, 8:1081–1085 (1993).

Edwards, H.M., et al., "Effect of Dietary Calcium on Tibial Dyschondroplasia. Interation with Light, Choelcalciferol, 1–25–Dihydroxycholecalciferol, Protein and Synthetic Zeolite", Poultry Sci., 71:2041–2055 (1992).

* cited by examiner

Primary Examiner—Chhaya D. Sayala
(74) Attorney, Agent, or Firm—Welsh & Katz, Ltd.

(57) ABSTRACT

Animal feed premix particles containing a carrier and a food additive is disclosed. The carrier is plant seed product having an ash content of less than about 10 percent by weight. The food additive 25-hydroxycholecalciferol, is soluble in organic solvents and is water-insoluble. An additive-effective amount of the food additive is homogeneously admixed with the carrier to prepare the premix particles.

5 Claims, No Drawings

STABILIZED FOOD ADDITIVE

DESCRIPTION

1. Technical Field

The present invention generally to a stabilized food additive. More particularly, the present invention relates to a particulate food additive premix comprised of a carrier that is a particulate plant seed product having an ash content of less than about 10 percent by weight and a homogeneously admixed food additive.

2. Background of the Invention

In rapidly growing animals, such as chickens, turkeys, and ducks, skeletal abnormalities frequently occur. One common skeletal abnormality is tibial dyschondroplasia ("TD"), which is characterized by an unmineralized, unvascularized mass of cartilage located in the proximal ends of the tibiotarsus and the tarsusmetatarsus. Depending on the extent of TD, this abnormality can sufficiently weaken the animal's bones such that the animal can experience difficulty walking and be prone to falling. These conditions lead to a decrease in the animal's growth rate and in certain instances causes the animal to prematurely die. Weakened bones resulting from TD also hamper the mechanical processing of the animals experiencing this condition.

Several dietary factors have been found to have major effects on the expression of TD. For example, Stark et al., U.S. Pat. No. 5,695,794, which is assigned to the assignee of the present application, describes using 25-hydroxycholecalciferol ("25-HCC") for treating or preventing TD. Edwards, Jr., U.S. Pat. Nos. 5,154,925, 5,316,770, and 5,366,736, describe treating TD by supplementing poultry feed with Vitamin $D_3$ (cholecalciferol ["CC"]) and certain of its hydroxylated derivatives, such as 25-HCC and 1,25-hydroxycholecalciferol ("1,25-DHCC").

Each of these patents describes using the supplement (food additive) in conjunction with poultry feed that is primarily formed from ground yellow corn and dehulled soybean meal. Another common carrier for use with the preceding supplements is a mixture of rice hulls, calcium carbonate, and mineral oil.

A problem with poultry feed premixes using CC, 25-HCC, and 1,25-DHCC is that those materials can rapidly degrade after being mixed with the prior art carriers and held at a temperature of 40° C. Degradation of CC, 25-HCC, and 1,25-DHCC limits the useful life of the poultry feed premix.

For example, poultry feed premix with 25-HCC beadlets admixed with rice hulls typically loses approximately 15 to 20 percent of the 25-HCC concentration in about one week when held at 40° C. Nearly half of the 25-HCC initially present in the supplemented poultry feed is degraded in four weeks at a temperature of 40° C. On the other hand, when stored at ambient temperature in a laboratory or warehouse, those compositions exhibited about 2–4 percent loss after two weeks, about 11 percent loss after six weeks and about 19 percent loss after twelve weeks.

The nutritional importance of vitamins that are soluble in fat is known. Goodman et al., "Fat-Soluble Vitamins", *The Pharmacological Basis of Therapeutics*, $8^{th}$ ed., pg. 1553 (1993). For example, consuming a diet with adequate levels of vitamins A, K, and E promotes, among other things, metabolism, circulation, and vision.

In an article entitled "Factors Affecting Storage Stability of Vitamin A, Riboflavin, and Niacin in a Broiler Diet Premix", [*Poultry Science* 65:987 (1986)], Zhuge et al. describe studies on the stability of vitamin A, riboflavin, and niacin supplements when dispersed on a number of carriers. These researchers reported stability to be enhanced by using a carrier of either ground corn cobs or rice hulls as compared to ground sorghum or ground corn.

Because of these conditions, the initial level of supplementation must be increased to ensure that the poultry feed contains at least a desired level of the supplement. The increased supplement level increases the cost of producing the supplemented animal feed. The present invention, described hereinafter, provides one solution to the problem of food supplement degradation.

Summary of the Invention

The present invention relates to a stabilized food additive that is provided as a particulate animal feed premix. The animal feed premix comprises carrier particles and a homogeneously admixed food additive. The carrier is a plant seed product that has an ash content of less than about 10 percent by weight, and preferably less than about 5 weight percent by weight. The food additive is soluble in organic solvents and is water-insoluble. The stabilized food additive is produced by homogeneously admixing an additive-effective amount of the food additive with the carrier particles.

The present invention has general benefits and advantages. One benefit is that degradation of the food additive is substantially reduced when used in conjunction with the carrier of the present invention when compared to the degradation of the food additive used with prior art carriers.

An advantage of the present invention is that a contemplated animal food premix is compatible and readily admixed with usually-used animal feeds. Another benefit of the present invention is that a preferred particulate animal feed premix flows readily and thereby provides easy handling to the user.

Another advantage is that the carrier used in the present invention is a compatible energy and nutritional source as compared to the usually used rice hulls and calcium carbonate that contribute substantially no energy of nutritional value to the animal being fed.

Still further benefits and advantages of the present invention will be apparent to a person of ordinary skill from the description that follows.

Detailed Description of the Invention

The present invention relates to a particulate stabilized food additive premix. The stabilized food additive premix contains carrier particles that are homogeneously admixed with a food additive. Using the food additive in conjunction with the carrier in a premix of the present invention substantially reduces the rate at which the food additive degrades at elevated temperature when compared to the degradation rate of food additives used in conjunction with prior art carriers.

The carrier used in the present invention is a particulate plant seed product selected to have an ash concentration of less than about 10 percent by weight. Preferably, the ash concentration of the carrier is less than about 5 percent by weight. Unless identified otherwise, all references in the present application to percent are percent by weight.

It has surprisingly been found that using a carrier comprised of plant seed product particles having the specified ash concentration substantially reduces the degradation of the food additive, when compared with the degradation of the food additive observed when used with a conventional carrier, such as a mixture of rice hulls, calcium carbonate, and mineral oil having ash concentrations of about 15 to about 20 percent for rice hulls and 100 percent for calcium carbonate.

A broadly useful particulate carrier having the preceding ash content is preferably obtained from plant seeds in which at least the germ portion has been removed, although whole plant seeds can also be used. Suitable plant seeds for use in the present invention include corn, wheat, rice, barley, rye, oats, and combinations thereof. The ash contents of various plant seed product carriers that are suitable for use with the present invention are set forth in Table 1, below.

TABLE 1

Ash Content of Carriers

| Material | Ash content (percent) |
| --- | --- |
| Degermed corn meal | 0.4 |
| Whole corn | 1.5 |
| Degermed corn flour | 0.6 |
| Extruded whole corn | 1.5 |
| Soft ground wheat | 2.0 |
| Wheat midds | 2.4 |
| Ground barley | 4.6 |
| High protein soybean meal | 5.8 |
| Rice hulls | 15–20 |

Degermed corn is used in some preferred embodiments as the carrier in one or more of the following particulate forms: extruded whole corn, corn, grits, meal, flour, and starch. Particularly suitable corn product particles for use as a carrier with the present invention are degermed corn meal and degermed corn flour, which can be obtained from Lauhoff Grain Company (Danville, Ill.).

To enhance the ability to use the premix in formulating poultry feed, the carrier is preferably ground to a particle size sufficiently small to pass through a 10 mesh sieve, U.S. Standard sieve size, about 2.00 millimeters. A person of ordinary skill in the art will appreciate that the carrier can be of coarser or finer particle size depending upon the ultimate use to which the premix is to be put.

The food additive is preferably a vitamin, vitamin precursor or vitamin metabolite that is soluble in organic solvents, and is preferably water-insoluble. The term "vitamin precursor" is used herein to mean a compound that is converted in vivo into a vitamin. Such precursors are sometimes referred to in the art as "vitamers". Goodman et al., "Fat-Soluble Vitamins", *The Pharmacological Basis of Therapeutics*, $8^{th}$ ed., pg. 1524 (1993). Exemplary vitamin precursors or vitamers include 1α-hydroxycholecalciferol and 25-hydroxycholecalciferol (25-HCC) are precursors of 1,25-dihydroxychole-calciferol [vitamin 1,25-$(OH)_2D_3$] and retinol esters that are precursors of retinol and retinoic acid (vitamin A), and pyridoxal and pyridoxamine that are precursors of pyridoxine (vitamin $B_6$).

As used herein, the phrase "soluble in organic solvents" means that a food additive has a solublity of one part solute per 1000 parts or fewer of solvent in one or more of ethanol, acetone, benzene, petroleum ether, hexane, dioxane, chloroform, ether, and vegetable oil. The phrase "water-insoluble" means that the food additive is soluble in water at one part solute per 10,000 or more parts of water.

The food additive is preferably a fat-soluble vitamin, a fat-soluble vitamin metabolite or a fat-soluble vitamer that are collectively referred to herein as an "oleo-soluble vitamin". Exemplary oleo-soluble vitamins include vitamin A, retinoic acid, vitamin D, vitamin $D_3$, 25-HCC, 1-HCC, 1,25-$(OH)_2D_3$, vitamin E, vitamin K, and the like. The food additive can also be a carotenoid that is a hydrocarbon (a carotene) such as α-carotene, β-carotene or lycopene, or is an oxygenated carotenoid (a xanthophyll) such as lutein, zeaxanthin or astaxanthin.

A preferred food additive used in the present invention is vitamin $D_3$ (CC) or a hydroxide thereof, such as 25-HCC. A carrier for vitamin $D_3$ or a hydroxide such as 25-HCC is a plant seed product as discussed before. A preferred plant seed is corn and the plant seed product can be extruded whole corn, or degermed products such as degermed corn flour or degermed corn meal.

The CC or 25-HCC is preferably provided in the form of generally spherical small pellets containing 0.5 to about 20 percent, and preferably about 1 to about 4 percent, of the additive that are conventionally referred to as "beadlets". Beadlets containing 25-HCC are commercially available from the IsoGen Division of the Monsanto Company (Naperville, Ill.) under the designation HY-D®.

The free-flowing beadlets have diameters of about 30 and 60 microns and contain 25-HCC stabilized with antioxidants present in a matrix of hydrogenated vegetable oil such as hydrogenated cotton seed oil, wheat-germ oil, safflower oil, soybean oil, and the like. An exemplary beadlet contains about 5 to about 100 milligrams of 25-HCC per gram and preferably about 10 and 50 milligrams of 25-HCC per gram.

The concentration of the food additive in the premix and the amount of premix admixed with an animal food are selected to provide the animal with an amount of the supplement that is effective to treat a desired condition the animal is experiencing or as a prophylactic to prevent the occurrence of such a condition. Techniques for selecting an appropriate amount of 25-HCC to be incorporated into the premix for treating TD in poultry are described in Stark et al., U.S. Pat. No. 5,695,794, which is hereby incorporated by reference.

The food additive is incorporated into the premix in an amount that provides a concentration of 25-HCC, for example, in the premix of about 5 to about 200 milligrams per pound of the premix. Preferably, the concentration of the food additive in the premix is about 20 to about 150 milligrams per pound (or about 44 to about 330 mg/kg).

In one embodiment, the premix is prepared by dry-blending the carrier and the food additive until a substantially homogeneous mixture is obtained. A person of ordinary skill in the art will appreciate that a variety of techniques can be used to perform the dry-blending.

Alternatively, the premix is prepared by dry mixing the 25-HCC beadlets with the carrier to form a homogeneous admixture that is then heated to a temperature of approximately 70° C. to cause the beadlets to melt. In this technique, the 25-HCC and other components in the beadlets coat carrier particles, although all carrier particles need not be coated. Commercial scale dry mixing can also cause the beadlets to coat the carrier particles without the need for added heat. The previous technique causes the carrier and 25-HCC beadlets to be homogeneously mixed.

A characteristic directed to the ability to handle the premix of the present invention with conventional handling equipment is the flowability of the premix particles. The flowability is believed to be related to the particle size of the premix. Formulating the premix with the carrier and the food additive at the particle size set forth before provides the premix with desirable flow characteristics.

The flowability of the premix is preferably evaluated based on the angle of repose. The angle of repose is preferably calculated by placing a stainless steel cylinder of 5 cm diameter on a flat surface. The product to be assayed (100–200 g) is first run through a sieve (Tyler equivalent 20 mesh), from approximately 15 cm above the cylinder, to provide even flow onto the cylinder. The product forms a cone on the cylinder. From the height (h) of the cone and the radius (r; 2.5 cm) of the cylinder, the angle of repose, a, can be calculated via the tangent (tan a=h/r). This method is that reported in Coehlo, *Foodstuffs*, 68(9):20 (Mar. 3, 1997).

The angle of repose exhibited by the premix produced according to the present invention is less than about 55 degrees and preferably about 30 and 45 degrees. The animal feed industry views feed materials exhibiting angles of repose of less than or equal to 31 degrees to be excellent and 32 and 45 degrees to be good.

Another characteristic in evaluating the premix is whether the carrier particles and the food additive desegregate; i.e., become non-homogeneously admixed, when the premix is permitted to settle. This characteristic is primarily a factor when the carrier and the food additive are dry-blended. The premix prepared according to the dry-blending and melt techniques of the present invention does not exhibit a statistically significant degree of desegregation when permitted to settle.

The following examples are offered to further illustrate, but not limit the present invention.

EXAMPLE 1

Comparative Degradation of 25-HCC Dry-Blended with Different Carriers

The performance of potential carrier particles on the degradation of 25-HCC was studied using a premix having a carrier that was either degermed yellow corn meal (FCM 350, Lauhoff Grain Company), degermed yellow corn flour (CCF 600, Lauhoff Grain Company), or a standard carrier containing a mixture of rice hulls, calcium carbonate, and mineral oil. The 25-HCC (HY-D®, IsoGen) was in the form of beadlets.

The particulate premix was formed by dry-blending either carrier (at about 100 grams) and 25-HCC so that the concentration of 25-HCC was approximately 62.5 milligrams per pound of carrier. The coating was performed by mixing the carrier and the 25-HCC in a fluted, round bottom flask.

Approximately equal amounts of each premix were placed in separate containers. The containers were maintained at a temperature of approximately 40° C. during the study period. The concentration of 25-HCC was measured at 1, 2, and 4 weeks by extracting three samples of about 3 grams each for each assay. The decrease in 25-HCC concentration with respect to the initial 25-HCC concentration for each premix is reported in Table 2, below.

TABLE 2

Degradation of 25-HCC in Dry-Blended Animal Food Premixes at 40° C.

| Time (weeks) | Degermed Corn Meal | Degermed Corn Flour | Standard Carrier |
| --- | --- | --- | --- |
| 1 | −6.0 | −5.0 | −16.7 |
| 2 | −8.6 | −8.2 | −29.6 |
| 4 | −17.4 | 2.7* | −46.5 |

The results shown in Table 2 indicate that the premixes formulated with the corn meal and the corn flour carriers exhibited a 25-HCC degradation rate and amount of degradation that was considerably less than the premix containing the standard carrier for each time period.

The degradation of 25-HCC of the corn flour premix at 4 weeks, which is identified with an *, was lower than the degradation of 25-HCC at 1 week and 2 weeks. Such a result was unexpected, a cause could not be determined, and this test result may be in error.

EXAMPLE 2

Comparative Degradation of 25-HCC Melt-Coated onto Different Carriers

The performance of a contemplated premix was also evaluated with respect to carriers that were coated using a melt technique. The materials and concentrations used in this example were the same as in Example 1.

The coating of the carrier was performed by first tumbling the carrier particles and the 25-HCC beadlets in a flask to form a homogeneous admixture, then the flask was immersed in a water bath having a temperature of approximately 70° C. while agitation of the contents continued. The heat from the water bath caused the 25-HCC beadlets to melt and thereby be coated onto the carrier particles to produce the premix.

Approximately equal amounts of each premix were placed in separate containers. The containers were maintained at a temperature of approximately 40° C. during the study period. The concentration of 25-HCC was measured at 1, 2, and 4 weeks. The decrease in 25-HCC concentration with respect to the initial 25-HCC concentration for each premix is reported in Table 3, below.

TABLE 3

Degradation of 25-HCC in Melt Blended Animal Food Premixes

| Time (weeks) | Degermed Corn Meal | Degermed Corn Flour | Standard Carrier |
| --- | --- | --- | --- |
| 1 | −4.3 | −1.7 | −17.2 |
| 2 | −8.4 | −2.8 | −26.6 |
| 4 | −14.3 | −8.0 | −44.7 |

The results shown in Table 3 indicate that the premixes formulated with the corn meal and the corn flour carriers exhibited a 25-HCC degradation rate that was considerably less than the premix containing the standard carrier for each time period.

EXAMPLE 3

Scale-Up of Example 1

The premix formulations set forth in Example 1 were reprepared using a batch size of approximately 200 pounds. Each premix was prepared dry-blending in a ribbon blender. Samples of each premix were maintained at a temperature of approximately 40° C. during the four-week stability study. The decrease in 25-HCC concentration with respect to the initial 25-HCC concentration for each premix is reported in Table 4, below.

TABLE 4

Degradation of 25-HCC in
Dry-Blended Animal Food Premixes

| Time (weeks) | Degermed Corn Meal | Degermed Corn Flour | Standard Carrier |
|---|---|---|---|
| 1 | −3.1 | −2.0 | −22.0 |
| 2 | −5.7 | −6.4 | −34.7 |
| 4 | −16.0 | −12.3 | −49.4 |

The results of each premix composition were fitted into an exponential decay equation and the time required for loss of 10 percent of the active agent was determined for each premix. Using that calculation, the corn meal formulation retained 90 percent of the 25-HCC for approximately 2.64 weeks. The corn flour formulation retained 90 percent of the 25-HCC for approximately 3.26 weeks. The standard carrier formulation retained 90 percent of the 25-HCC for approximately 0.32 weeks. The corn meal and corn flour formulations provided 7.7 and 9.5 fold increases in stability, respectively, when compared to the standard carrier formulation.

EXAMPLE 4

Degradation Studies With Further Carriers

The procedure set forth in Example 1 was repeated using either degermed corn flour, degermed corn meal or ground, extruded whole corn (particles) as the carrier as compared to a 1:4 parts by weight mixture of corn meal and rice hulls or rice hulls alone. The dry-blending technique was used to mix the carrier particles and the 25-HCC.

The concentration of 25-HCC was periodically measured and the time to reach approximately 90 percent of the initial 25-HCC concentration was calculated as before. The degermed corn flour, degermed corn meal, and extruded whole corn premixes produced in this example retained a 25-HCC concentration of greater than 90 percent of the initial 25-HCC for approximately 3.3, 2.2, and 4.1 weeks, respectively. The rice hull-containing compositions retained 90 percent of their 25-HCC for less than one week. These results are shown more specifically in Table 5, below.

TABLE 5

| Source | Stability (Weeks to 90% of Active) | Ash Content (Percent) |
|---|---|---|
| Degermed Corn Flour | 3.3 | 0.6 |
| Degermed Corn Meal | 1.8, 2.1, 2.2, 2.6 | 0.4 |
| Extruded Whole Corn | 4.1 | 1.5 |
| Corn Meal/Rice Hulls (2:8) | 0.89 | 15 |
| Rice Hull | 0.35 | 19 |

EXAMPLE 5

Calculation of Angle of Repose

The flow characteristics of the premix particles were evaluated by calculating an angle of repose for each material. A stainless steel block having a diameter of approximately 5 centimeters and a height of approximately 5 centimeters was used in this evaluation. The corn meal-based premix prepared in Example 1 was used in this example.

The premix was sieved onto the cylinder until an approximately constant height was produced. The angle of repose was determined via the tangent as described previously herein. The angle of repose over a series of five runs was approximately 35.1 degrees.

EXAMPLE 6

Premix Settling Determinations

The settling characteristics of the premix were evaluated using the corn meal premix prepared in Example 1 by the dry-blending technique. Settling was examined by filling a stack of three 8 inch sieve rings with the premix particles and then subjecting the filled stack to approximately one hour on a sieve shaker/tapper. During this time, the premix compacted to approximately 80 percent of the initial volume.

Samples were taken from each sieve ring and then analyzed for 25-HCC concentration. The results are reported in Table 6, below. Those results indicate that the premix does not appear to exhibit desegregation of 25-HCC from the carrier when the premix settles.

TABLE 6

Settling Characteristics of
Dry-Blended Animal Food Premix

| Location | Concentration of 25-HCC (micrograms per gram) |
|---|---|
| Pan | 133 |
| First Ring | 141 |
| Second Ring | 144 |
| Third Ring | 139 |

EXAMPLE 7

Long-term Stability at Ambient Temperature

A large batch of a corn meal-based premix was prepared as in Example 3 using 25-HCC and Degermed Yellow Corn Meal (FCM 350; Lauhoff Grain Co., Danville, Ill.) with the aid of a ribbon mixer capable of containing 500 pounds of premix. A 50 pound sample was stored at ambient temperature in the laboratory, with samples taken about every four weeks to determine the stability of the 25-HCC under these conditions. The results are shown in Table 7, below.

TABLE 7

Percent Change in 25-HCC Content

| Week | Change (percent) |
|---|---|
| 4 | 1.6 |
| 8 | 4.9 |
| 12 | 1.5 |
| 17 | 1.0 |
| 20 | -1.7 |

As is seen by the above results, the contemplated premix was extremely stable over the time period of this study at ambient temperatures.

The foregoing description and the examples are intended as illustrative and are not to be taken as limiting. Still other variations within the spirit and scope of this invention are possible and will readily present themselves to those skilled in the art.

What is claimed is:

1. Animal feed premix particles comprising a carrier of ground corn, ground extruded whole corn, corn grits, corn meal, corn flour or corn starch particles that are sized to pass through a size 10 mesh sieve and are homogeneously admixed with an additive-effective amount of 25-hydroxycholecalciferol, the premix particles exhibiting an angle of repose in a flowability assay of less than about 55 degrees.

2. The animal feed premix according to claim 1 wherein the 25-hydroxycholecalciferol is present at a concentration of about 5 and 200 milligrams per pound of premix.

3. The animal feed premix according to claim 1 wherein the premix particles exhibit an angle of repose of about 30 to about 45 degrees.

4. Animal feed premix particles comprising a corn meal or corn flour carrier sized to pass through a size 10 mesh sieve that are homogeneously admixed with 25-hydroxycholecalciferol (25-HCC), the 25-HCC being present in an amount of about 5 to about 200 milligrams per pound of premix, the premix particles exhibiting an angle of repose in a flowability assay of about 30 to about 45 degrees.

5. The animal feed premix according to claim 4 wherein the 25-HCC is present at about 40 to about 220 milligrams per kilogram.

* * * * *